(12) United States Patent
Guo et al.

(10) Patent No.: US 9,110,651 B2
(45) Date of Patent: Aug. 18, 2015

(54) ELECTRONIC DEVICE FOR DETECTING CONSUMPTION OF POWER

(71) Applicants: AMBIT MICROSYSTEMS (SHANGHAI) LTD., Shanghai (CN); HON HAI PRECISION INDUSTRY CO., LTD., New Taipei (TW)

(72) Inventors: Zhi-Fu Guo, Shanghai (CN); Yao-Nan Chang, New Taipei (TW)

(73) Assignees: AMBIT MICROSYSTEMS (SHANGHAI) LTD., Shanghai (CN); HON HAI PRECISION INDUSTRY CO., LTD., New Taipei (TW)

( * ) Notice: Subject to any disclaimer, the term of this patent is extended or adjusted under 35 U.S.C. 154(b) by 304 days.

(21) Appl. No.: 13/863,392

(22) Filed: Apr. 16, 2013

(65) Prior Publication Data

US 2014/0075216 A1   Mar. 13, 2014

(30) Foreign Application Priority Data

Sep. 12, 2012   (CN) .......................... 2012 1 0335733

(51) Int. Cl.
*G06F 1/26* (2006.01)
*G06F 1/32* (2006.01)

(52) U.S. Cl.
CPC ....... *G06F 1/263* (2013.01); *G06F 1/26* (2013.01); *G06F 1/3203* (2013.01); *G06F 1/3206* (2013.01); *G06F 1/3209* (2013.01); *G06F 1/3212* (2013.01)

(58) Field of Classification Search
CPC .......... G06F 1/26; G06F 1/263; G06F 1/3203; G06F 1/3206; G06F 1/3209; G06F 1/3212
See application file for complete search history.

(56) References Cited

U.S. PATENT DOCUMENTS

| | | | | |
|---|---|---|---|---|
| 2003/0188210 | A1* | 10/2003 | Nakazato ...................... | 713/320 |
| 2010/0241890 | A1* | 9/2010 | Goodart et al. ............... | 713/340 |
| 2011/0246805 | A1* | 10/2011 | Chen .............................. | 713/340 |
| 2011/0260689 | A1* | 10/2011 | Kano ............................ | 320/128 |
| 2011/0276810 | A1* | 11/2011 | Chang et al. .................. | 713/300 |
| 2011/0307732 | A1* | 12/2011 | Furusho et al. ............... | 713/340 |
| 2012/0030487 | A1* | 2/2012 | Takinami ...................... | 713/320 |

FOREIGN PATENT DOCUMENTS

| | | |
|---|---|---|
| TW | 201128375 | 8/2011 |
| TW | 201131348 | 9/2011 |

* cited by examiner

*Primary Examiner* — Jaweed A Abbaszadeh
*Assistant Examiner* — Cheri Harrington
(74) *Attorney, Agent, or Firm* — Novak Druce Connolly Bove + Quigg LLP

(57) ABSTRACT

An electronic device includes a current detection module, two path switches, a processing unit, and two control circuits. Two terminals of the current detection module are connected to an external power port and a battery. The two path switches are connected to the two terminals. A first control circuit is connected to the processing unit and to one path switch. A second control circuit is connected to the processing unit and to another path switch. When the electronic device is powered on, whether using power from the battery or from the external power port, the device can analyze the power consumed by the functioning parts of the device, including (when power is taken from the external power port) the amount of current taken in charging the battery.

16 Claims, 2 Drawing Sheets

ELECTRONIC DEVICE FOR DETECTING CONSUMPTION OF POWER

BACKGROUND

1. Technical Field

The present disclosure relates to electronic devices, and particularly to an electronic device capable of detecting and specifying power consumption by individual elements within the electronic device.

2. Description of Related Art

Electronic devices, such as mobile phones and tablet computers usually include a number of functioning parts, such as a processor, a display, and software applications, and a battery to power these functioning parts. Those electronic devices can display battery level to indicate the remaining energy of the battery. However, they cannot detect power consumption of each functioning part, thus, cannot give information to the user when one function module consumes a lot, or an excessive amount, of energy.

In addition, when an electronic device is being charged, it is only capable of detecting the total power consumption including the functioning parts and the battery recharging, and cannot give separate power consumptions relating to the functioning parts and the battery.

An electronic device capable of detecting and categorizing power consumptions to overcome the described limitations is thus needed.

BRIEF DESCRIPTION OF THE DRAWINGS

Many aspects of the present disclosure are better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the views.

DETAILED DESCRIPTION

Embodiments of the present disclosure will be described with reference to the accompanying drawings.

Figure 1:
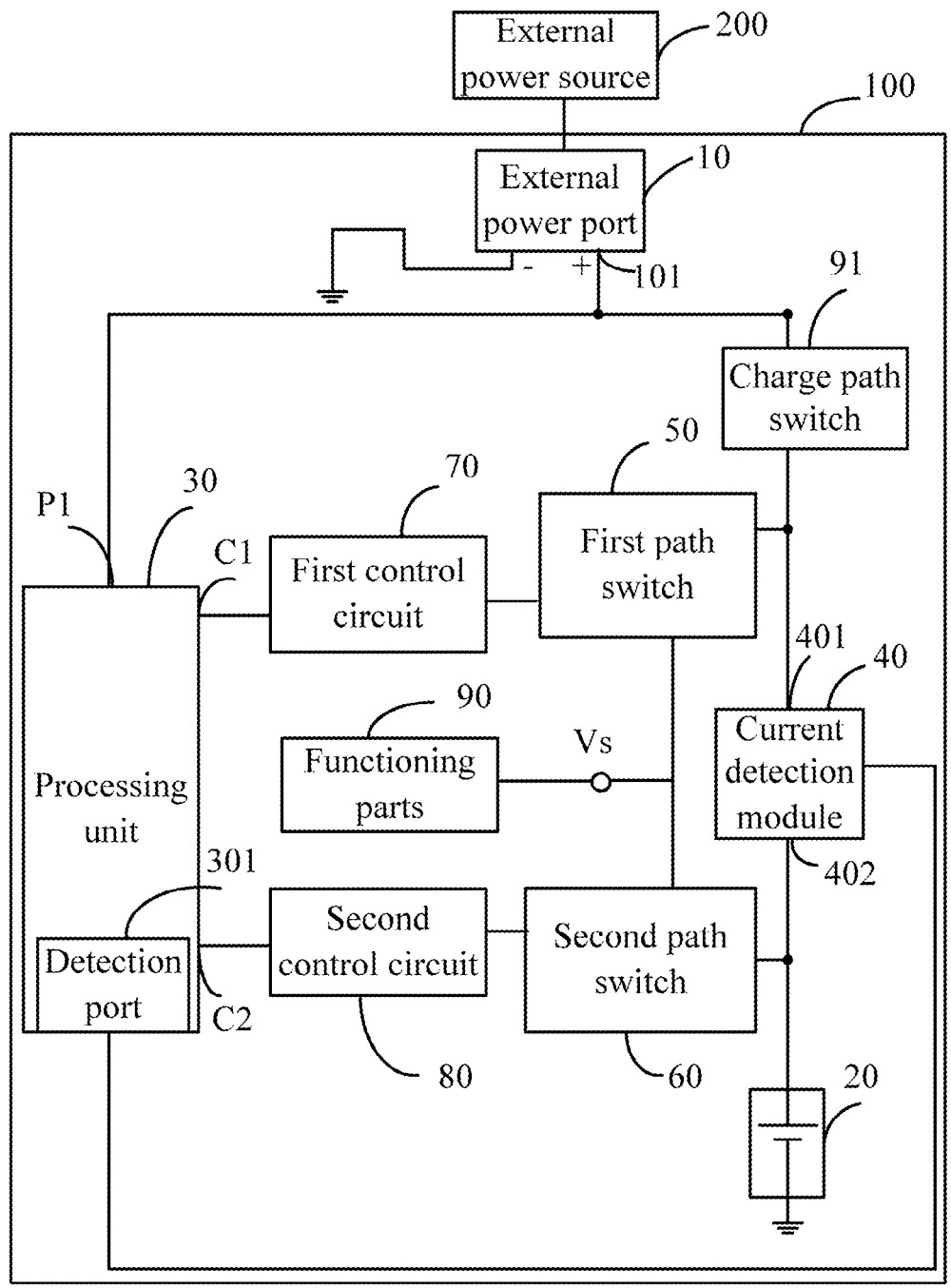
FIG. 1 is a block diagram of one embodiment of an electronic device capable of detecting particular consumptions of power.

FIG. 1 illustrates a block diagram of an electronic device 100 capable of detecting particular consumptions of power. The electronic device 100 includes an external power port 10, a battery 20, a processing unit 30, a current detection module 40, a first path switch 50, a second path switch 60, a first control circuit 70, a second control circuit 80, a system power input port Vs, and a number of functioning parts 90.

The external power port 10 receives an external power source 200, such as a USB power source or a power adapter. The external power port 10 can be a USB port or a power adapter port.

The system power input port Vs receives power from the external power source 200 or from the battery 20, and powers the functioning parts 90. In detail, when the external power port 10 has been connected to the external power source 200, the system power input port Vs receives power from the external power source 200 and then powers the functioning parts 90. When the external power port 10 is not connected to the external power source 200, the system power input port Vs takes power from the battery 20 and then powers the functioning parts 90. In the embodiment, the functioning parts 90 include software applications, such as a browser application, a reader application, and hardware units, such as a processor and a display unit.

The current detection module 40 includes a first terminal 401 and a second terminal 402. The first terminal 401 is connected to an anode input port 101 of the external power port 10, and the second terminal 402 is connected to an anode Vbat of the battery 20. The current detection module 40 detects the amount of current flowing through it and converts the current to a detection voltage.

The first path switch 50 is connected between the first terminal 401 of the current detection module 40 and the system power input port Vs. The second path switch 60 is connected between the second terminal 402 of the current detection module 40 and the system power input port Vs.

The processing unit 30 includes a detection port 301, a first control pin C1, and a second control pin C2. The detection port 301 is connected to the current detection module 40, the processing unit 30 obtains the detection voltage from the current detection module 40 via the detection port 30.

The first control circuit 70 is electrically connected between the first path switch 50 and the first control pin C1, and is used to control the first path switch 50 to turn on or off according to control signals output by the first control pin C1. In detail, the first control circuit 70 controls the first path switch 50 to turn on when receiving a first control signal, and controls the first path switch 50 to turn off when receiving a second control signal.

The second control circuit 80 is electrically connected between the second path switch 60 and the second control pin C2, and is used to control the second path switch 60 to turn on or off according to control signals output by the second control pin C2. In detail, the second control circuit 80 controls the second path switch 60 to turn on when receiving the first control signal, and controls the second path switch 60 to turn off when receiving the second control signal.

When the electronic device 100 is powered on, if the processing unit 30 detects that the external power port 10 is not connected to the external power source 200, the processing unit 30 controls the first control pin C1 to output a first control signal and controls the second control pin C2 to output a second control signal. The first control circuit 70 controls the first path switch 50 to turn on when receiving the first control signal from the first control pin C1, and the second control circuit 80 controls the second path switch 60 to turn off when receiving the second control signal from the second control pin C2. Then, the battery 20, the current detection module 40, the first path switch 50, and the system power input port Vs are in a loop, and the battery 20 provides power to the functioning parts 90 via the current detection module 40, the first path switch 50, and the system power input port Vs.

Because the current flowing through the current detection module 40 is all taken by the functioning parts 90, this current reflects the total power consumption of the functioning parts 90. The processing unit 30 then determines the current flowing through the current detection module 40 according to the detection voltage instantaneously obtained, and determines the power consumption of the functioning parts 90 according to the current flowing through the current detection module 40.

In the embodiment, the processing unit 30 also includes a voltage detection pin P1, the voltage detection pin P1 is connected to the anode input port 101 of the external power port 10. The processing unit 30 determines that the external power port 10 has been connected to the external power source 200 when the voltage detection pin P1 detects a digital-high voltage, and determines the external power port 10 is not connected to the external power source 200 when the voltage detection pin P1 detects a digital-low voltage.

When the electronic device 100 is powered on and is being charged, namely, the electronic device 100 is powered on and the processing unit 30 detects that the external power port 10 is connected to the external power source 200, the processing unit 30 by default controls the first control pin C1 to output the second control signal and controls the second control pin C2 to output the first control signal. The first control circuit 70 controls the first path switch 50 to turn off when receiving the second control signal from the first control pin C1, and the second control circuit 80 controls the second path switch 60 to turn on when receiving the first control signal from the second control pin C2. Thus, the current provided by the external power source 200 flows through the current detection module 40 and is then divided to power the functioning parts 90 via the second path switch 60 and the system power input port Vs, and also to charge the battery 20. In this situation, the current flowing through the current detection module is the current provided by the external power source 200.

Then, the processing unit 30 determines the current provided by the external power source according to the obtained detection voltage. The processing unit 30 can then determine a total consumption of power of the functioning parts 90 and of the battery according to the obtained detection voltage.

When the electronic device 100 is powered on and is being charged, and the processing unit 30 receives a command to query charging status, the processing unit 30 controls the first control pin C1 to output the first control signal and controls the second control pin C2 to output the second control signal. Thus, as described above, the first control circuit 70 controls the first path switch 50 to turn on when receiving the first control signal from the first control pin C1, and the second control circuit 80 controls the second path switch 60 to turn off when receiving the second control signal from the second control pin C2. Thus, a current provided by the external power source 200 is then divided into power for the functioning parts 90 via the path switch 50 and the system power input port Vs and power for charging the battery 20 via the current detection module 40. Here, the current flowing through the current detection module 40 is the current which is charging the battery 20.

Then, the processing unit 30 can determine the charging status of the battery 20 according to the obtained detection voltage converted by the current flowing through the current detection module 40. Specifically, the processing unit 30 determines the current required to charge the battery 20 according to the detection voltage obtained via the detection port 301, and then determines the charging status, such as the speed of charge of the battery 20 based on the current required to charge the battery 20. The charging status is considered as the power consumption of the battery 20. In the embodiment, the command to query the charging status can be produced by operating a particular button, or selecting a menu item.

When the electronic device 100 is powered on and is being charged, the processing unit 30 may receive a command to query power consumption of the functioning parts 90. The processing unit 30 obtains the current provided by the external power source and the charging current as above, and deletes the level of charging current from the current provided by the external power source 200, to obtain the amount of current provided to the functioning parts 90. Thus, the processing unit 30 can determine the power consumption of the functioning parts 90 based on the amount of current provided to the functioning parts 90. The command to query the power consumption of the functioning parts 90 also can be produced by operating a particular button, or selecting a menu item.

Therefore, the electronic device 100 can detect the respective consumptions of power of the functioning parts 90 and of the battery 20, when the electronic device 100 is powered on and the battery 20 is being charged. The electronic device 100 also can detect the power consumption of the functioning parts 90 when the electronic device is powered on and is powered by the battery 20.

In the embodiment, the electronic device 100 also includes a charge path switch 91. The charge path switch 91 is connected between the anode input port 101 and the current detection module 40. The charge path switch 91 is turned on when the external power port 10 connects to the external power source 200, and is turned off when the external power port 10 is not connected to the external power source 200.

Figure 2:
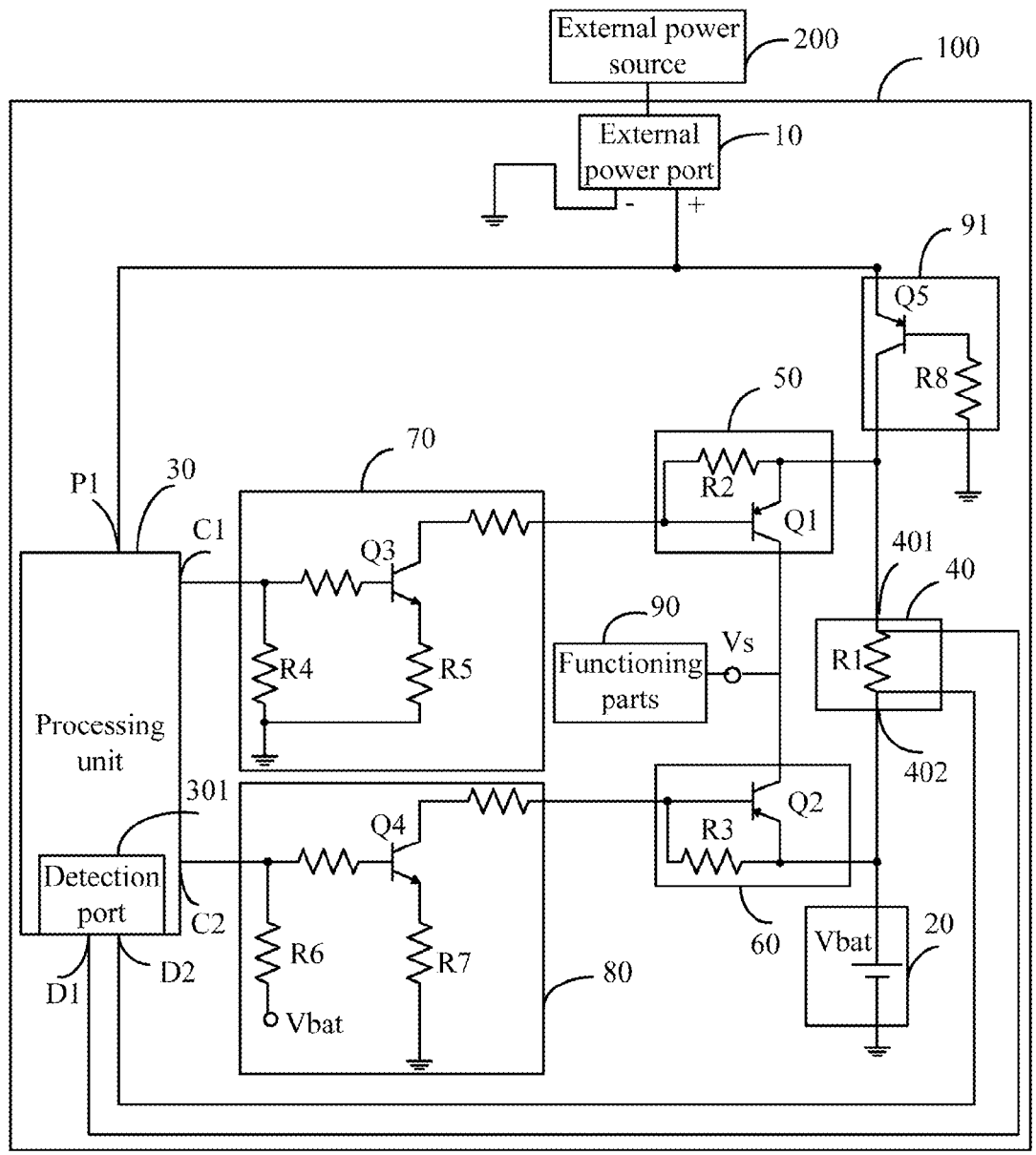
FIG. 2 is a circuit diagram of one embodiment of the electronic device of FIG. 1.

Referring to FIG. 2 together, FIG. 2 illustrates a circuit diagram of the electronic device 100 of FIG. 1. In the circuit, the current detection module 40 is a resistor R1. The first terminal 401 and the second terminal 402 of the current detection module 40 are respectively a first terminal 401 and a second terminal 402 of the resistor R1.

The first path switch 50 includes a positive-negative-positive (PNP) bipolar junction transistor (BJT) Q1 and a resistor R2. The resistor R2 is connected between a base of the PNP BJT Q1 and an emitter of the PNP BJT Q1. The emitter of the PNP BJT Q1 is also connected to the first terminal 401 of the resistor R1, and a collector of the PNP BJT Q1 is connected to the system power input port Vs.

The second path switch 60 includes a PNP BJT Q2 and a resistor R3. The resistor R3 is connected between a base of the PNP BJT Q2 and an emitter of the PNP BJT Q2. The emitter of the PNP BJT Q2 is also connected to the second terminal of the resistor R1 and the anode Vbat of the battery 20. A collector of the PNP BJT Q2 is also connected to the system power input port Vs.

The first control circuit 70 includes a negative-positive-negative (NPN) BJT Q3 and resistors R4, R5. A base of the NPN BJT Q3 is electrically connected to the first control pin C1 of the processing unit 30, the base of the NPN BJT Q3 is also grounded via the resistor R4. An emitter of the NPN BJT Q3 is grounded via the resistor R5, and a collector of the NPN BJT Q3 is electrically connected to the base of the PNP BJT Q1.

The second control circuit 80 includes an NPN BJT Q4 and resistors R6, R7. A base of the NPN BJT Q4 is electrically connected to the second control pin C2 of the processing unit 30, and the base of the NPN BJT Q4 is also connected to the anode Vbat of the battery 20 via the resistor R6. An emitter of the NPN BJT Q4 is grounded via the resistor R7, and a collector of the NPN BJT Q4 is electrically connected to the base of the PNP BJT Q2.

In the embodiment, the first control signal output by the first control pin C1 or the second control pin C2 is a digital-high voltage signal, and the second control signal output by the first control pin C1 or the second control pin C2 is a digital-low voltage signal.

As described, when the electronic device is powered on and the external power port 10 is not connected to the external power source 200, the processing unit 30 controls the first control pin C1 to output the first control signal, and controls the second control pin C2 to output the second control signal. Because the first control signal is the digital-high voltage signal and the second control signal is the digital-low voltage signal, the NPN BJT Q3 is turned on due to the base of the NPN BJT Q3 receives the digital-high voltage signal from the first control pin C1 and the NPN BJT Q4 is turned off due to the base of the NPN BJT Q3 receives the digital-low voltage signal from the second control pin C2. The base of the PNP BJT Q1 is grounded via the NPN BJT Q3 which is turned on, thus the PNP BJT Q1 is turned on, namely the first path switch 50 is turned on. The base of the PNP BJT Q2 is connected to the anode Vbat of the battery 20 via the resistor R3 and at high voltage, thus the PNP BJT Q2 is turned off, namely the second path switch 60 is turned off.

Therefore, the current provided by the battery flows through the resistor R1, the PNP BJT Q1, and the system power input port Vs and then is provided to the functioning parts 90. The processing unit 30 obtains the voltage of the resistor R1 via the detection port 301 and determines the power consumption of the functioning parts 90 according to the obtained voltage of the resistor R1, namely the detection voltage.

When the electronic device 100 is powered on and the battery 20 is being charged, if the processing unit 30 does not receive a command to query the power consumption of the functioning parts 90 or a command to query the battery level, the processing unit 30 by default controls the first control pin C1 to output the second control signal and controls the second control pin C2 to output the first control signal.

Because the first control signal is the digital-high voltage signal and the second control signal is the digital-low voltage signal, the NPN BJT Q3 is turned off due to the base of the NPN BJT Q3 receives the digital-low voltage, and the NPN BJT Q4 is turned on due to the base of the NPN BJT Q4 receives the digital-high voltage. The base of the PNP BJT Q1 is electrically connected to the anode input port 101 of the external power port 10, thus the PNP BJT Q1 is turned off, namely the first path switch 50 is turned off. The base of the PNP BJT Q2 is grounded via the NPN BJT Q4 which is turned on, thus the PNP BJT Q2 is turned on, namely, the second path switch 60 is turned on.

Therefore, the current provided by the external power source 200 is divided between charging the battery 20 and powering the functioning parts 90 after flowing through the resistor R1. In this situation, the current flowing through the resistor R1 is the current provided by the external power source 200.

When the electronic device 100 is powered on and the battery 20 is being charged, as described, if the processing unit 30 receives a command to query the charging status, the processing unit 30 controls the first control pin C1 to output the first control signal and controls the second control pin C2 to output the second control signal. Thus, the PNP BJT Q1 is turned on and the PNP BJT Q2 is turned off, the current provided by the external power source 200 is divided between powering the functioning parts 90, via the PNP BJT Q1 and the system power input port Vs, and charging the battery 20 via the resistor R1. Here, the current flowing through the resistor R1 is the charging current taken by the battery 20.

When the electronic device 100 is powered on and the battery 20 is being charged, if the processing unit 30 receives a command to query the power consumption of the functioning parts 90, the processing unit 30 deletes the current taken by the battery 20 from the amount of current provided by the external power source 200, thus obtaining the amount of current provided to the functioning parts 90. The processing unit 30 thus determines the power consumption of the functioning parts 90 according to the amount of current provided to the functioning parts 90.

In detail, in the embodiment, the detection port 301 of the processing unit 30 includes a first detection pin D1 and a second detection pin D2. The first detection pin D1 and the second detection pin D2 are respectively connected to the first terminal 401 and the second terminal 402 of the resistor R1. The detection voltage obtained by the detection port 301 is the voltage of the resistor R1, namely, the voltage difference between the first terminal 401 and the second terminal 402. In the embodiment, the processing unit 30 stores a resistance value of the resistor R1 and a relationship table. The relationship table defines relationships between a number of amounts of current (values) and power consumption states. When the processing unit 30 obtains the detection voltage, the processing unit 30 calculates the current according to the resistance value of the resistor R1 and the detection voltage, and then determines the power consumption state corresponding to that level of current. In the embodiment, the power consumption states include the rate of power consumption, state of battery charge and charging rate. In the embodiment, the processing unit 30 provides visible information concerning the power consumption states to the user after determining the power consumption states.

The charge path switch 91 includes a PNP BJT Q5 and a resistor R8. A base of the PNP BJT Q5 is grounded via the resistor R8, an emitter of the PNP BJT Q5 is connected to the anode input port 101 of the external power port 10, and a collector of the PNP BJT Q5 is connected to the first terminal 401 of the resistor R1. When the external power port 10 connects to the external power source 200, the emitter of the PNP BJT Q5 obtains a high voltage, and a voltage between the emitter of the PNP BJT Q5 and the base of the PNP BJT Q5 is positive, thus the PNP BJT Q5 is turned on. When the external power port 10 is not connected to the external power source 200, there is no voltage between the emitter of the PNP BJT Q5 and the base of the PNP BJT Q5, and the PNP BJT Q5 is turned off.

In another embodiment, P-channel metal oxide semiconductor Field Effect Transistors (PMOSFETs) can substitute for the PNP BJTs, and N-channel metal oxide semiconductor Field Effect Transistors (NMOSFETs) can substitute for these NPN BJTs.

In the embodiment, the electronic device 100 can be a mobile phone, a computer, a digital photo frame, a digital camera, or the like.

It is understood that the present embodiments and their advantages will be understood from the foregoing description, and various changes may be made thereto without departing from the spirit and scope of the disclosure or sacrificing all of its material advantages, the examples hereinbefore described merely being exemplary embodiments of the present disclosure.

What is claimed is:

1. An electronic device capable of detecting consumption of power, the electronic device comprising: a plurality of functioning parts;
    an external power port configured to connect to an external power source;
    a battery;
    a system power input port configured to receive power from the battery or the external power source and then power the functioning parts,
    a current detection module configured to detect current flowing therethrough and convert the current to a detection voltage, wherein the current detection module comprises a first terminal and a second terminal, the first terminal is connected to an anode input port of the external power port, and the second terminal is connected to an anode of the battery;
    a first path switch connected between the first terminal of the current detection module and the system power input port;

a second path switch connected between the second terminal of the current detection module and the system power input port;

a processing unit comprising a detection port, a first control pin, and a second control pin, wherein, the detection port is connected to the current detection module, the processing unit obtains the detection voltage from the current detection module via the detection port;

a first control circuit electrically connected between the first path switch and the first control pin, and configured to control the first path switch to turn on or off according to control signals output by the first control pin; and a second control circuit electrically connected between the second path switch and the second control pin, and configured to control the second path switch to turn on or off according to control signals output by the second control pin;

wherein, when the electronic device is powered on, if the processing unit detects the external power port does not connect to the external power source, the processing unit controls the first control pin to output a first control signal and controls the second control pin to output a second control signal; the first control circuit controls the first path switch to turn on when receiving the first control signal from the first control pin, and the second control circuit controls the second path switch to turn off when receiving the second control signal from the second control pin; the battery provides power to the functioning parts via the current detection module, the first path switch, and the system power input port, the processing unit then determines the current flowing through the current detection module according to the obtained detection voltage, and determines power consumption of the functioning parts according to the current flowing through the current detection module.

2. The electronic device according to claim 1, wherein the electronic device is powered on and the processing unit detects the external power port is connected to the external power source, the processing unit by default controls the first control pin to output the second control signal and controls the second control pin to output the first control signal, the first control circuit controls the first path switch to turn off when receiving the second control signal from the first control pin, and the second control circuit controls the second path switch to turn on when receiving the first control signal from the second control pin, thus, the current provided by the external power source is flowed through the current detection module and then divided to power the functioning parts via the second path switch and the system power input port and to charge the battery, the processing unit determines current provided by the external power source according to the obtained detection voltage, and then determines a total consumption of power of the functioning parts and the battery according to the current provided by the external power source.

3. The electronic device according to claim 2, wherein when the electronic device is powered on and the processing unit detects the external power port is connected to the external power source and receives a command to query charging status, the processing unit controls the first control pin to output the first control signal and controls the second control pin to output the second control signal, the first control circuit controls the first path switch to turn on when receiving the first control signal from the first control pin, and the second control circuit controls the second path switch to turn off when receiving the second control signal from the second control pin, thus, the current provided by the external power source is divided to power the functioning parts via the path switch and the system power input port and to charge the battery via the current detection module, the current flowing through the current detection module is the charging current charging the battery; the processing unit determines the charging current charging the battery according to the detection voltage obtained via the detection port, and then determines the charging status based on the charging current.

4. The electronic device according to claim 3, wherein when the electronic device is powered on and the processing unit detects the external power port is connected to the external power source and receives a command to query power consumption of the functioning parts, the processing unit respectively obtains the current provided by the external power source and the charging current, and then deletes the charging current from the current provided by the external power source to obtain current provided to the functioning parts, the processing unit then determines the power consumption of the functioning parts based on the current provided to the functioning parts.

5. The electronic device according to claim 4, wherein the commands to query the power consumption of the functioning parts and query the charging status can be produced by operating a particular button, or selecting a menu item.

6. The electronic device according to claim 4, wherein the processing unit stores a resistance value of the current detection module and a relationship table, the relationship table defines relationships between a number of current and power consumption states, when the processing unit obtains the detection voltage via the detection port, the processing unit calculates the current flowing through the current detection module according to the resistance value of the current detection module and the detection voltage, and then determines the power consumption state corresponding to the current according to the relationship table.

7. The electronic device according to claim 6, wherein the current detection module comprises a first resistor, a first terminal of the first resistor is electrically connected to anode input port of the external power source and a second terminal of the first resistor is electrically connected to the anode of the battery, wherein, the resistance value of the current detection module stored by the processing unit is a resistance value of the first resistor.

8. The electronic device according to claim 7, wherein the first path switch comprises a first positive-negative-positive (PNP) bipolar junction transistor (BJT) and a second resistor, the second resistor is connected between a base of the first PNP BJT and an emitter of the first PNP BJT; the emitter of the first PNP BJT also connects to the first terminal of the first resistor, a collector of the first PNP BJT is connected to the system power input port; the second path switch comprises a second PNP BJT and a third resistor, the second resistor is connected between a base of the second PNP BJT and an emitter of the second PNP BJT, the emitter of the second PNP BJT is also connected to the second terminal of the first resistor and the anode of the battery, a collector of the second PNP also connects to the system power input port.

9. The electronic device according to claim 8, wherein the first control circuit comprises a first negative-positive-negative (NPN) BJT, a fourth resistor, and a fifth resistor, a base of the first NPN BJT is electrically connected to the first control pin of the processing unit, the base of the NPN BJT is also grounded via the fourth resistor, an emitter of the NPN BJT is grounded via the fifth resistor, a collector of the first NPN BJT is electrically connected to the base of the first PNP BJT; the second control circuit comprises a second NPN BJT, a sixth resistor and a seventh resistor, a base of the second NPN BJT is electrically connected to the second control pin of the processing unit, the base of the second NPN BJT is also connected to the anode of the battery via the sixth resistor, an emitter of the second NPN BJT is grounded via the seventh resistor, a collector of the second NPN BJT is electrically connected to the base of the second PNP BJT.

10. The electronic device according to claim 9, wherein the first control signal output by the first control pin or the second control pin is a digital-high voltage signal, the second control signal output by the first control pin or the second control pin is a digital-low voltage signal; when the processing unit controls the first control pin to output the first control signal and controls the second control pin to output the second control signal, the first NPN BJT is turned on due to the base of the first NPN BJT receives the digital-high voltage signal from the first control pin, the base of the first PNP BJT is grounded via the first NPN BJT which is turned on, thus the first PNP BJT is turned on accordingly; the second NPN BJT is turned off due to the base of the second NPN BJT receives the digital-low voltage signal from the second control pin, the base of the second PNP BJT is connected to the anode of the battery via the third resistor and at high voltage, thus the PNP BJT is turned off accordingly.

11. The electronic device according to claim 10, wherein when the processing unit controls the first control pin to output the second control signal and controls the second control pin to output the first control signal, the first NPN BJT is turned off due to the base of the first NPN BJT receives the digital-low voltage signal from the first control pin, the base of the first PNP BJT is electrically connected to the anode input port of the external power port and at low voltage, thus the first PNP BJT is turned off accordingly; the second NPN BJT is turned on due to the base of the second NPN BJT receives the digital-high voltage signal from the second control pin, the base of the second PNP BJT is grounded via the second NPN BJT which is turned on and at low voltage, thus the PNP BJT is turned on accordingly.

12. The electronic device according to claim 7, wherein the detection port of the processing unit comprises a first detection pin and a second detection pin, the first detection pin and the second detection pin are respectively connected to the first terminal and the second terminal of the first resistor and the detection voltage obtained by the detection port is the voltage of the resistor.

13. The electronic device according to claim 1, further comprises a charge path switch, the charge path switch is connected between the anode input port and the current detection module, wherein, the charge path switch is turned on when the external power port connects to the external power source, and is turned off when the external power port is not connect to the external power source.

14. The electronic device according to claim 13, wherein the charge path switch comprises includes a third PNP BJT and a eighth resistor, a base of the third PNP BJT is grounded via the eighth resistor, an emitter of the third PNP BJT is connected to the anode input port of the external power port, a collector of the third PNP BJT is connected to the first terminal of the resistor current detection module.

15. The electronic device according to claim 14, wherein when the external power port connects to the external power source, the emitter of the third PNP BJT obtains a high voltage, a voltage between the emitter of the third PNP BJT and the base of the third PNP BJT is positive, thus, the third PNP BJT is turned on accordingly, when the external power port does connects to the external power source, there is no voltage between the emitter of the third PNP BJT and the base of the third PNP BJT, the third PNP BJT is turned off accordingly.

16. The electronic device according to claim 4, wherein the processing unit further comprises a voltage detection pin, the voltage detection pin is connected to the anode input port of the external power port, the processing unit determines the external power port has connected to the external power source when the voltage detection pin detects a digital-high voltage, and determines the external power port is not connect to the external power source when the voltage detection pin detects a digital-low voltage.

\* \* \* \* \*